(12) United States Patent
Newstadt et al.

(10) Patent No.: US 8,171,406 B1
(45) Date of Patent: May 1, 2012

(54) AUTOMATING USER INTERFACE NAVIGATION

(75) Inventors: Keith Newstadt, Newton, MA (US); Maxim Gubin, Walnut Creek, CA (US)

(73) Assignee: Symantec Corporation, Mountain View, CA (US)

(*) Notice: Subject to any disclaimer, the term of this patent is extended or adjusted under 35 U.S.C. 154(b) by 447 days.

(21) Appl. No.: 12/544,215

(22) Filed: Aug. 19, 2009

(51) Int. Cl.
*G06F 3/00* (2006.01)
(52) U.S. Cl. ......... 715/700; 715/733; 715/764; 715/781
(58) Field of Classification Search .................. 715/700, 715/733, 738, 764, 781
See application file for complete search history.

(56) References Cited

U.S. PATENT DOCUMENTS

| | | | | |
|---|---|---|---|---|
| 7,310,776 | B2* | 12/2007 | Mansell et al. | 715/744 |
| 7,412,660 | B2* | 8/2008 | Donalson | 715/777 |
| 7,712,044 | B2* | 5/2010 | Lin-Hendel | 715/785 |
| 7,721,225 | B2* | 5/2010 | Montroy et al. | 715/809 |
| 7,761,807 | B2* | 7/2010 | Tapuska | 715/788 |

OTHER PUBLICATIONS

Current Wikipedia Entry describing Microsoft UI Automation, first released in 2005, 11 pages, retrieved from the internet http://en.wikipedia.org/wiki/Microsoft_UI_Automation on May 10, 2010.
Current Wikipedia Entry describing Microsoft Active Accessibility, first released in 1997, 11 pages, retrieved from the Internet http://en.wikipedia.org/wiki/Microsoft_Active_Accessibility on May 10, 2010.

* cited by examiner

*Primary Examiner* — Xiomar L Bautista
(74) *Attorney, Agent, or Firm* — Brill Law Office; Jeffrey Brill

(57) ABSTRACT

A system processes a set of instructions, each of which indicates an action to perform on a user interface. The system does not have prior information concerning the layout of the user interface, nor does the system interact with the user interface through an automation API. For each instruction in the set, the system automatically performs the indicated action on the user interface. To do so, the system identifies the selected control on an active window, and determines whether it is the control to activate in order to perform the indicated action. If so, the system generates an input signal configured to activate the selected control, and sends the input signal to the user interface. If not, the system selects a new control and determines whether it is the desired one. The system cycles through the controls to find the desired one to activate.

17 Claims, 5 Drawing Sheets

AUTOMATING USER INTERFACE NAVIGATION

TECHNICAL FIELD

This disclosure pertains generally to computer user interfaces, and more specifically to automating user interface navigation.

BACKGROUND

Computer software user interfaces are designed to be operated by human beings. Like so many tasks, controlling user interfaces can be simple for a live person, but difficult to automate. However, there are cases when it is desirable for an automated process to navigate a user interface without the help of a person. One case is an automated tool that interacts with third party user interfaces, for example on the Web. An example of such a system is a program that automatically searches the Web for malware (e.g., viruses, Trojan horses, etc.). Such a system would need to download and install many different software packages in order to examine their contents. Different Web based installation programs can have widely different user interfaces. Thus, it would be desirable if the system could automatically operate a wide variety of user interfaces.

Another case is an automated testing tool that needs to drive a user interface in order to test the underlying software. As developers create new software, it is common to do a lot of automated testing in this manner. Because the user interface can change between builds, it would be desirable for the automated test tool to be able to drive various user interface configurations and formats.

One way for an automated process to drive user interfaces is to build the automated process such that it includes specific information concerning the user interface it is to operate. However, this significantly limits the utility of the automated process. For example, it would be desirable for the above-described Web searching system to be able to operate the interfaces of the different installation programs it encounters on the Web, concerning which it would have no previous information. In a similar vein, if the automated testing tool must be build such that it includes detailed information about a user interface it is to operate, it would have to be re-scripted every time the user interfaces changes. These problems are made even more complex by the wide variety of technologies used to implement contemporary user interfaces, such as Win32, Java, variations of HTML, Flash, etc.

Application Programming Interfaces (APIs) exist that can be employed in a software user interface to allow automated processes to interrogate and drive it. An example of such an automation API is Microsoft Active Accessibility. However, user interfaces are not required to support such APIs, and as a result most user interfaces do not. There is no existing mechanism that allows an automated process to operate a user interface that does not support an automated API, unless the automated process has prior information of the user interface layout. It would be desirable to address these issues.

SUMMARY

A user interface automated navigation system running on a computer automates user interface navigation. The user interface automated navigation system processes a set of instructions, each of which indicates an action to perform on a user interface. This set of instructions can be in the form of a script, supplied by, for example, a user or system administrator. The user interface automated navigation system does not have prior information concerning the layout of the user interface, nor does the user interface automated navigation system interact with the user interface by using an automation API.

For each instruction in the set, the user interface automated navigation system automatically performs the action on the user interface indicated by the instruction. To do so, the user interface automated navigation system identifies the selected control on an active window of the user interface, and determines whether it is the control to activate in order to perform the indicated action. If so, the user interface automated navigation system generates at least one input signal configured to activate the currently selected control, and sends the generated input signal(s) to the user interface. If the currently selected control is not the control to activate, the user interface automated navigation system selects a new control and determines whether the newly selected control is the desired one. The user interface automated navigation system can cycle through the controls on the windows until it finds the desired control to activate.

In order to identify the currently selected control on an active window of the user interface, the user interface automated navigation system can capture a first image of the active window of the user interface, generate at least one input signal configured to change the control focus, and send the generated input signal(s) to the user interface. The user interface automated navigation system can subsequently capture a second image of the active window of the user interface, and compare the two images.

To determine whether the currently selected control is the control to activate, the user interface automated navigation system can identify a label associated with the currently selected control, and compare the label to one or more indicator(s) of the control to activate. This comparison can be an image comparison, or the user interface automated navigation system can use OCR to convert the label to text and perform a text comparison.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
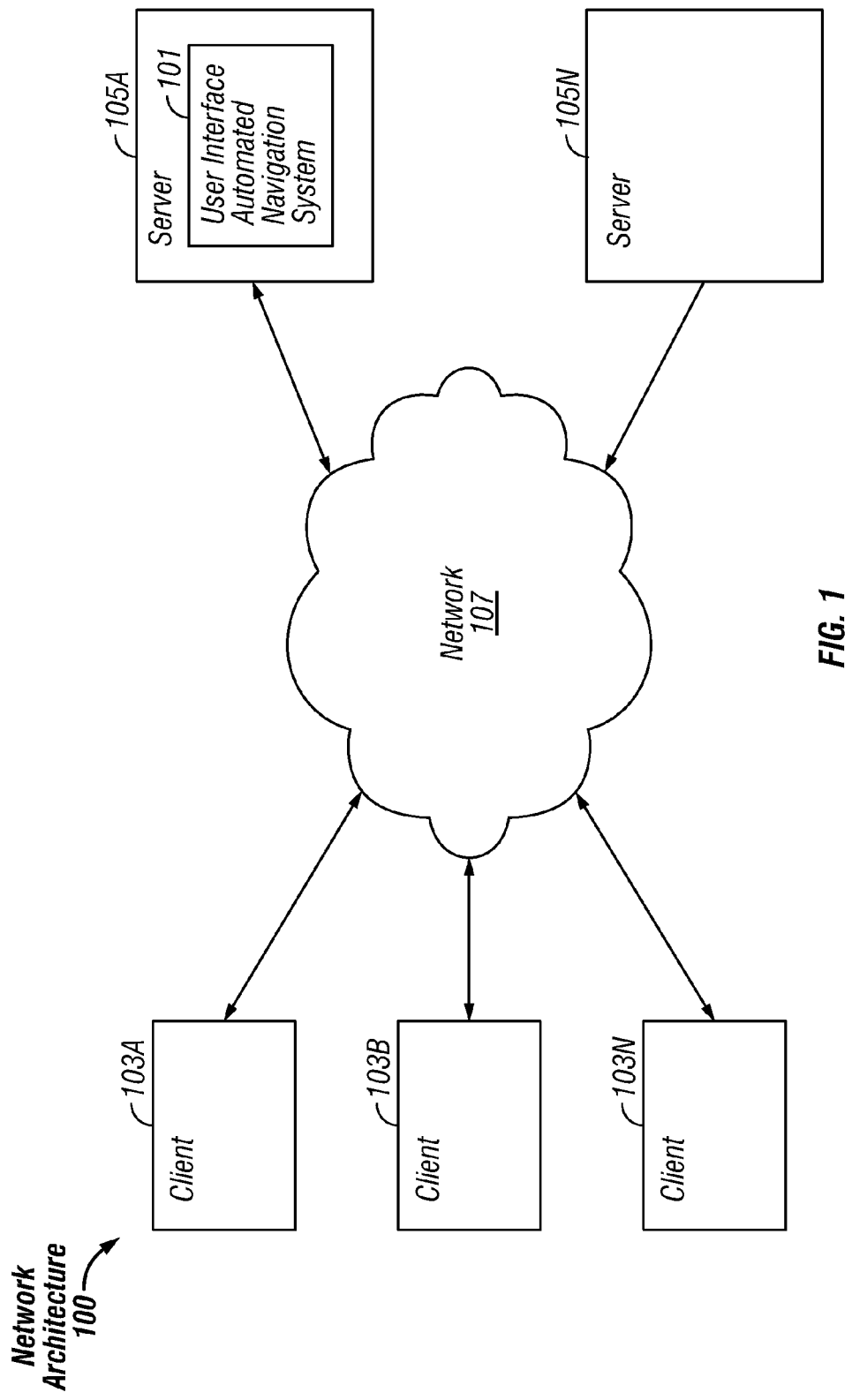
FIG. 1 is a block diagram of an exemplary network architecture in which a user interface automated navigation system can be implemented, according to some embodiments.

FIG. 1 is a block diagram illustrating an exemplary network architecture 100 in which a user interface automated navigation system 101 can be implemented. The illustrated network architecture 100 comprises multiple clients 103A, 103B and 103N, as well as multiple servers 105A and 105N. In FIG. 1, the user interface automated navigation system 101 is illustrated as residing on client 103A. It is to be understood that this is an example only, and in various embodiments various functionalities of this system 101 can be instantiated on a client 103, a server 105 or otherwise distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
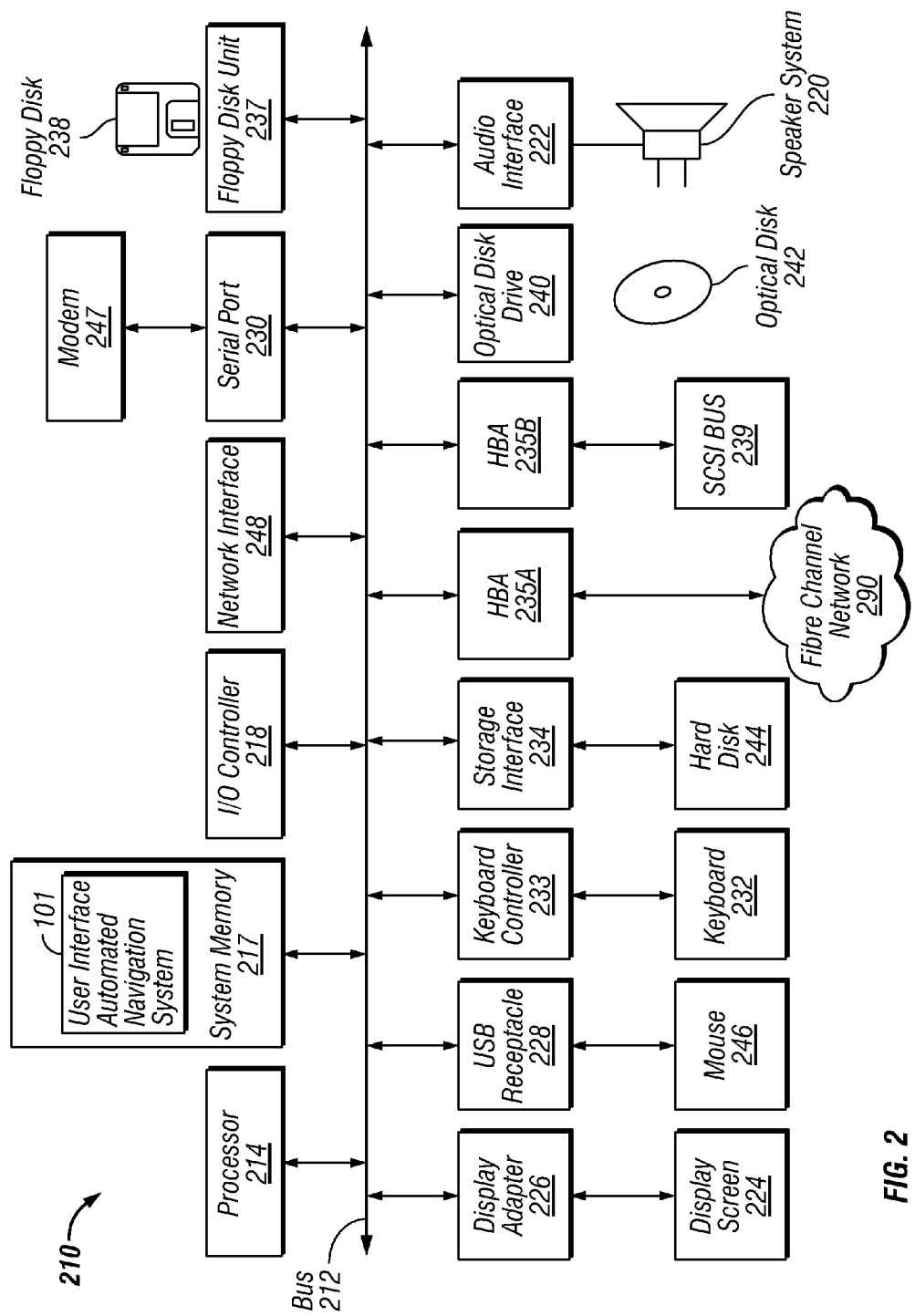
FIG. 2 is a block diagram of a computer system suitable for implementing a user interface automated navigation system, according to some embodiments.

FIG. 2 is a block diagram of a computer system 210 suitable for implementing a user interface automated navigation system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the user interface automated navigation system 101 is illustrated as residing in system memory 217. The workings of the user interface automated navigation system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
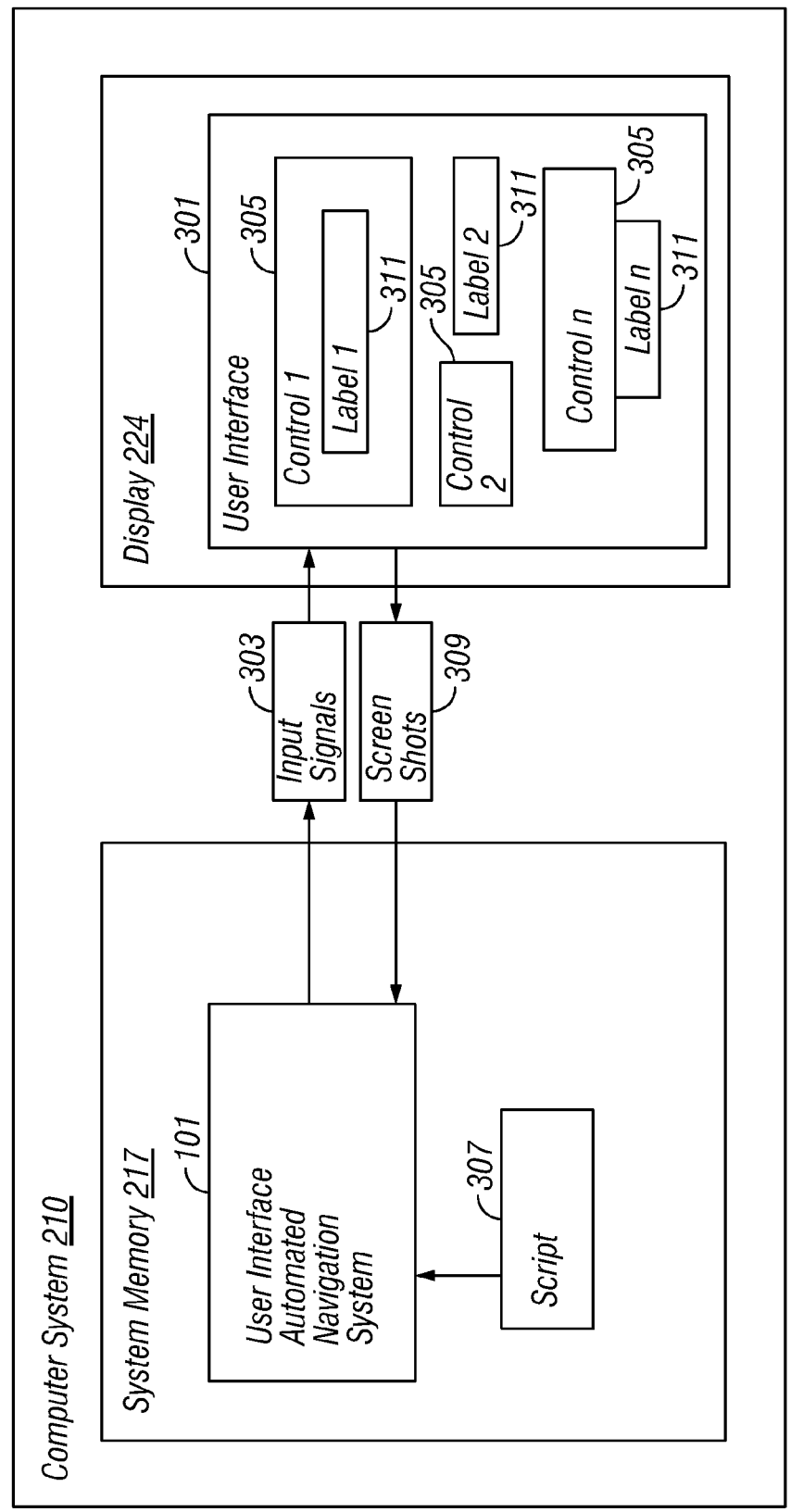
FIG. 3 is a block diagram of the operation of a user interface automated navigation system, according to some embodiments.
Figure 4:
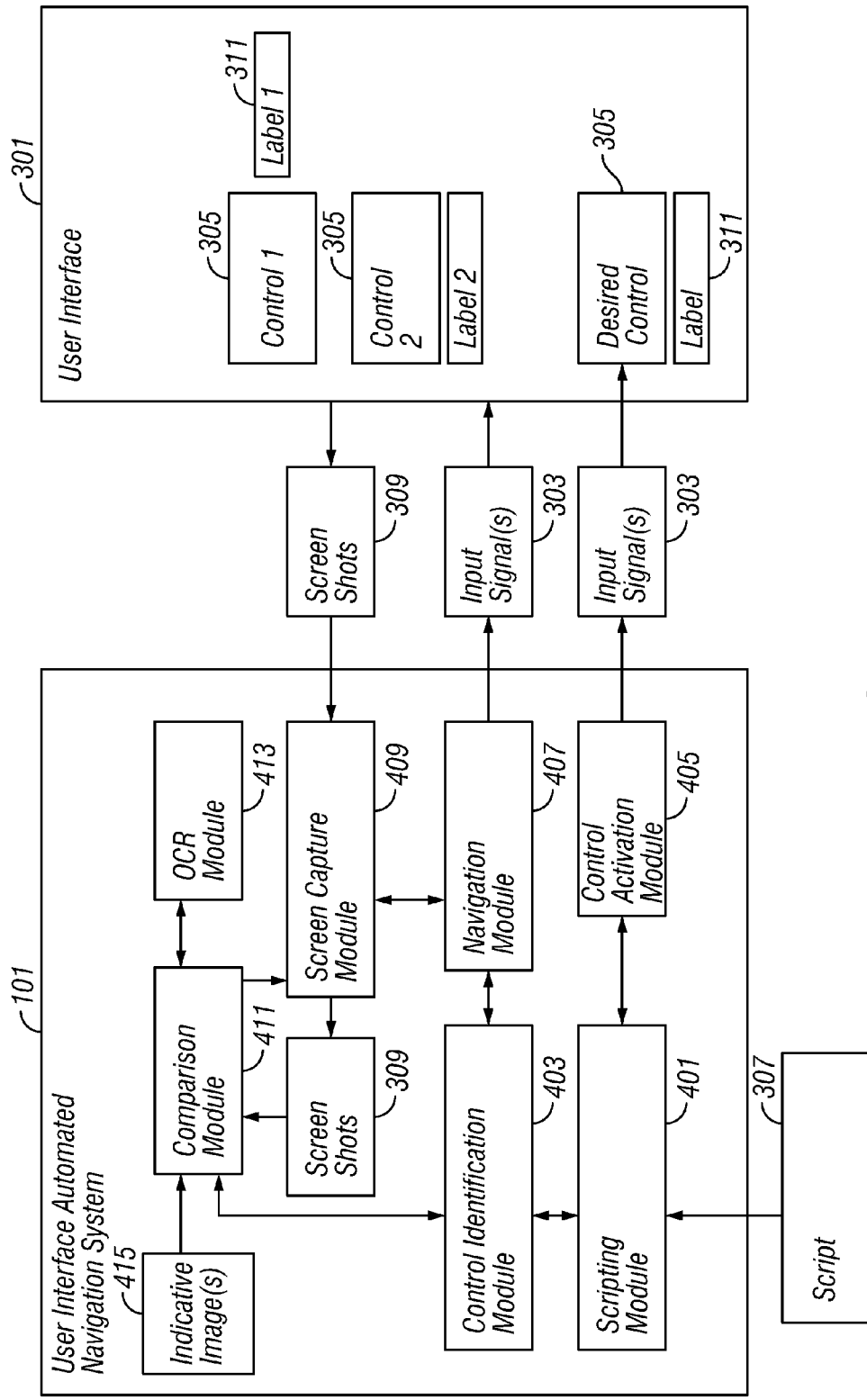
FIG. 4 is a block diagram illustrating specific modules of a user interface automated navigation system, according to some embodiments.

FIG. 3 illustrates a user interface automated navigation system 101, residing in the system memory 217 of a computer system 210 according to some embodiments. This user interface automated navigation system 101 is illustrated as residing on a single computer system 210, but as described above more, fewer or different functionalities of the user interface automated navigation system 101 can reside on a client 103, a server 105, or be otherwise distributed between multiple computer systems 210, including within a cloud-based computing environment in which the functionality of the user interface automated navigation system 101 is provided as a service over a network 107. It is to be understood that although the user interface automated navigation system 101 is illustrated in FIG. 3 as a single entity, the illustrated user interface automated navigation system 101 represents a collection of functionalities, which can be instantiated as a single or multiple modules as desired (an instantiation of specific, multiple modules of the user interface automated navigation system 101 is illustrated in FIG. 4). It is to be understood that the modules of the user interface automated navigation system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the user interface automated navigation system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the user interface automated navigation system 101 automatically drives a user interface 301 without the use of an automation API supported by the user interface 301, and without any prior information of the layout of the user interface 301. The user interface automated navigation system 101 accomplishes this by using a combination of input signals 303 (e.g., simulated keystrokes, pointing device operations such as mouse clicks, etc.) and image processing to identify the location and purpose of controls 305 (e.g., buttons, text boxes, prompts, etc.) on the user interface 301 it is controlling. Once a desired control 305 has been located, it can be activated by sending the proper input signal 303 (e.g., a mouse click or a series of keystrokes) to the active window of the user interface 301 that contains the control 305. As used herein, "window" means window or similar display object, depending upon the specific format of the user interface 301 in question. The present invention is not limited to any specific user interface 301.

To operate a user interface 301, the user interface automated navigation system 101 reads a script 307 or similar set of instructions, indicating what operations to perform on the user interface 301. Typically, each line of the script 307 directs the user interface automated navigation system 101 to perform a specific function by activating a given control 305 on a screen of the user interface 301. For example, suppose that the user interface automated navigation system 101 is processing a script 307 directing it to download and install a software program from a website. One line of the script 307 could indicate to activate a control 305 on the user interface 301 of the website that installs the software program. The script 307 could subsequently specify to check a "Yes" box, and then click on an "Okay to Proceed" button. It is to be understood that a script 307 specifies a series of actions to take, typically on a succession of screens of a user interface 301. A script 307 can be provided, for example, by a user or systems administrator.

As noted above, the user interface automated navigation system 101 processing a script has no information concerning the layout of the user interface(s) it is to operate. To carry out a command in the script 307, the user interface automated navigation system 101 sends navigation related input signals 303 to the active user interface 301 window, and captures images (i.e., screenshots 309) of the window between input signals 303. Each input signal 303 causes the window to display a visual indication that a new control 305 has the focus. By comparing the screenshots 309 taken before and after sending input signals 303, the user interface automated navigation system 101 is able to determine the location of the currently selected control 305 in the window of the user interface 301. For example, sending a tab key signal 303 to the active window shifts the focus to the next grouping of controls 305. Sending arrow key signals 303 navigates between the controls 305 in that group. Sending a spacebar down signal 303 activates the currently selected control 305, and subsequently sending an escape key signal 303 cancels the activation. In this manner, the user interface automated navigation system 101 can identify the currently selected control 305.

Once a specific control 305 is located, the user interface automated navigation system 101 determines whether the located control 305 is the one that the line of the script 307 being processed indicates to activate (i.e., the desired control 305). To make this determination, the user interface automated navigation system 101 identifies the label 311 (e.g., text or image) associated with the control 305. The label 311 associated with a control 305 is often found inside the borders of the control 305, as identified by the selection highlighting. If not located there, the associated label 311 is likely located to the right of the control 305. The user interface automated navigation system 101 compares the label 311 associated with a found control 305 to a set of images (or text) indicating the desired control 305 (e.g., the install button to click, the yes box to check, the okay button to click, etc.). As explained in greater detail below, this comparison can be made by using optical character recognition (OCR) and/or image comparison. Once the desired control 305 is identified, it can be activated by sending, for example, a mouse click signal 303 or appropriate keystroke signals 303 to the location of the control 303 in the window of the user interface 301.

FIG. 4 illustrates a multiple module instantiation of a user interface automated navigation system 101, according to one embodiment. It is to be understood that although modules of the user interface automated navigation system 101 are illustrated in FIG. 4 as separate entities, the illustrated user interface automated navigation system 101 represents a collection of functionalities, which can be instantiated as fewer, more or overlapping modules as desired.

As illustrated, a scripting module 401 processes a script 307 in order to drive a user interface 301. When the script 307 specifies to activate a particular control 305, the scripting module 401 calls a control identification module 403 to identify and locate the desired control 305. Once the desired control 305 is identified and located, the scripting module 401 calls a control activation module 405 to activate the control 305. The control activation module 405 sends pointing device operations and/or keystrokes in order to activate the desired control 305.

In order to identify the desired control 305, the control identification module 403 calls a navigation module 407 to determine locations of the controls 305 in the active window of the user interface 301. The navigation module 407 generates input signals 303 to navigate the user interface 301, and sends them to the active window. As described above, this changes the control focus, and thus the visual indicators displayed on the active window.

Before and after calling the navigation module 407, the control identification module 403 calls a screen capture module 409, which captures an image of the screen. Thus, the control identification module 403 receives an image of the active window before and after a navigation input signal 303 is sent. The control identification module 403 calls a comparison module 411 to compare these two screenshots 309 of the window, to determine the location in the window of the control 305 that has been selected by the navigation.

The comparison module 411 also determines whether the selected control 305 is the one the script 307 specifies to activate (i.e., the desired control 305). To do so, the comparison module 411 compares the label 311 of the selected control 305 to one or more images 415 indicative of the desired control 305, to see if it matches. For example, if the script 307 specifies to check a "Yes" box, the comparison module 411 compares the label 311 of the selected control 305 to an image 415 (or to each of a set of images 415) of a "Yes" box label 311, to determine whether the selected control 305 is a match. The indicative images 415 to which to compare labels 311 of selected controls 305 can be supplied, for example, by a user or system administrator. A collection of such indicative images 415 can be maintained in, for example, a centrally located or local database (not illustrated).

In order to compare a label 311 of a selected control 305 to an image 415 indicative of a desired control 305, the comparison module 411 can simply perform an image comparison. In some embodiments, instead of or in addition to performing an image comparison, the comparison module 411 calls an OCR module 413. The OCR module 413 uses optical character recognition to translate the image of text associated with a control 305 from image format to text format. This allows the comparison module 411 to compare the translated text to the text specified by the script 307.

The above-described process of screen capture, navigation, screen capture and comparison is repeated until a desired control 305 is identified and located. The control activation module 405 then sends the appropriate input signal(s) 303 to activate the identified control 305. These steps are repeated for each instruction in the script 307, thereby carrying out the actions specified therein.

Figure 5:
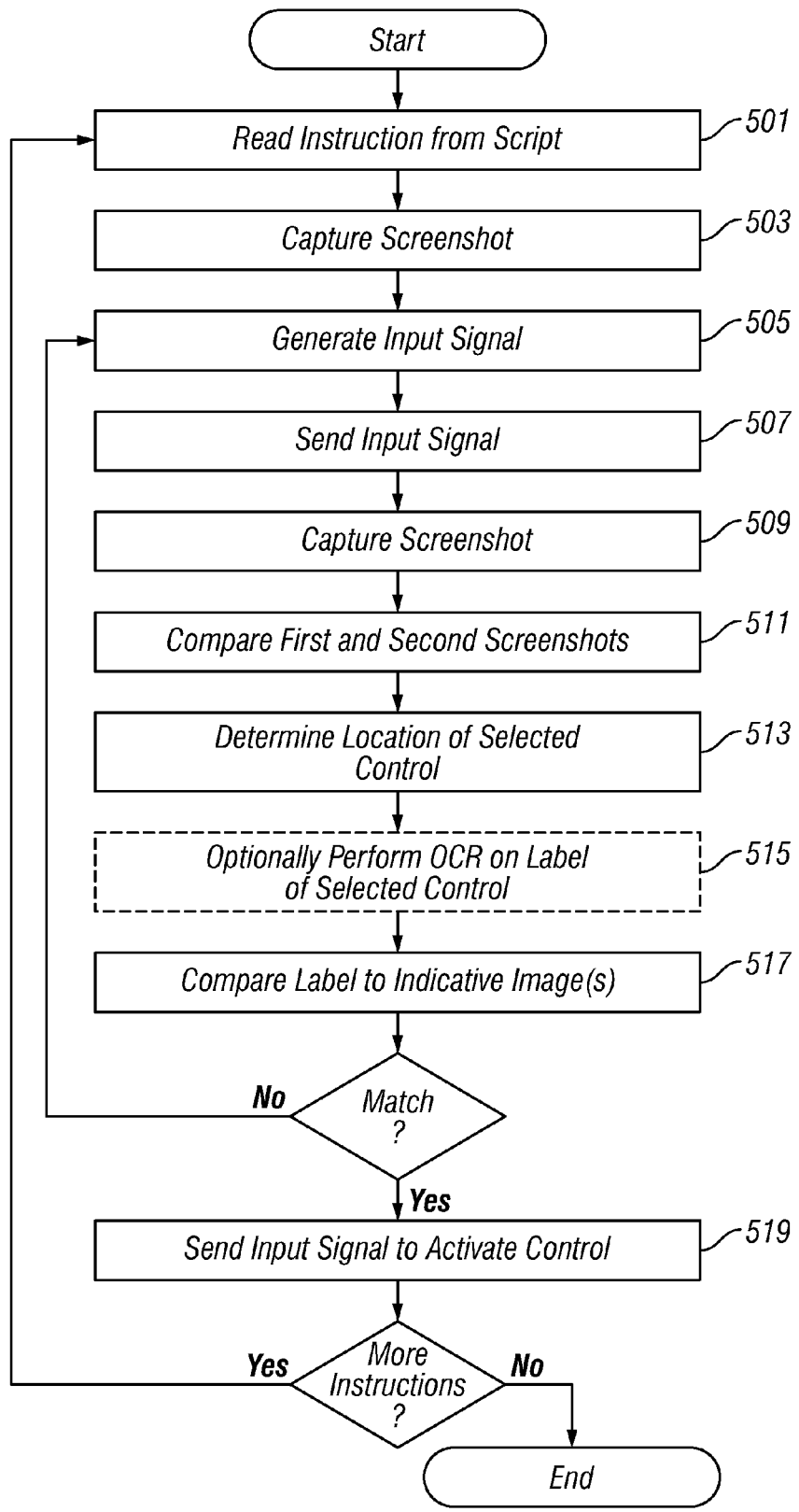
FIG. 5 is a flowchart illustrating steps for the operation of a user interface automated navigation system, according to some embodiments.

FIG. 5 illustrates steps for a user interface automated navigation system 101 (FIG. 1) to identify and activate desired controls 305 (FIG. 3), according to some embodiments. The scripting module 401 (FIG. 4) reads 501 an instruction from the script 307 (FIG. 3), specifying an action to perform on a user interface 301 (FIG. 3) (for example, click on an "Okay to Proceed" button). The screen capture module 409 (FIG. 4) captures 503 a screenshot 309 (FIG. 3) of the active window of the user interface 301 (FIG. 3). The navigation module 407 (FIG. 4) generates 505 an input signal 303 (FIG. 3) to navigate the user interface 301 (FIG. 3), and sends 507 the generated input signal 303 (FIG. 3) to the active window. The screen capture module 409 (FIG. 4) then captures 509 a screenshot 309 (FIG. 3) of the active window after the sending of the input signal 303 (FIG. 3). The comparison module 411 (FIG. 4) compare 511 these two screenshots 309 (FIG. 3), and determines 513 the location in the window of the control 305 (FIG. 3) that has been selected by the sending of the input signal 303 (FIG. 3). In some embodiments, an OCR module 413 (FIG. 4) performs 515 optical character recognition on the label 311 (FIG. 3) associated with the control 305 (FIG. 3), thereby translating the image into text format. In any case, the comparison module 411 (FIG. 4) compares 517 the label 311 (FIG. 3) of selected control 305 (FIG. 3) to image(s) 415 (FIG. 4) indicative of the desired control 305 (FIG. 3), to see if it matches. In embodiments in which the OCR module 413 (FIG. 4) translates images into text, the comparison module 411 (FIG. 4) performs a text comparison. In other embodiments, the comparison module 411 (FIG. 4) performs an image comparison.

If the selected control 305 (FIG. 3) matches the desired control 305 (FIG. 3), the control activation module 405 (FIG. 4) sends 519 the appropriate input signal 303 (FIG. 3) to activate the control 305 (FIG. 3). Otherwise, steps 505-517 are repeated, until the desired control 305 (FIG. 3) is located in the active window. So long as there are more instructions in the script 307 (FIG. 3), steps 501-519 are repeated for each instruction.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automating user interface navigation, the method comprising the steps of:
    processing a set of instructions, by a user interface automated navigation system running on a computer, each instruction indicating an action to perform on a user interface; and
    for at least one instruction in the set, automatically performing the action on the user interface indicated by the instruction, by performing at least the following steps by the user interface automated navigation system running on the computer, wherein the user interface automated navigation system does not have prior information concerning a layout of the user interface, and wherein the user interface automated navigation system does not interact with the user interface by using an automation Application Programming Interface supported by the user interface:
        identifying a currently selected control on an active window of the user interface, wherein identifying a currently selected control on an active window of the user interface further comprises:
            capturing a first image of the active window of the user interface;
            generating at least one input signal configured to change a control focus of the active window of the user interface;
            sending the at least one generated input signal to the user interface;
            capturing a second image of the active window of the user interface, after sending the at least one generated input signal to the user interface; and
            comparing the first image of the active window of the user interface and the second image of the active window of the user interface;
        determining whether the currently selected control is a control to activate in order to perform the action on the user interface indicated by the instruction; and
        responsive to whether the currently selected control is a control to activate in order to perform the action on the user interface indicated by the instruction, determining whether to activate the currently selected control.

2. The method of claim 1 wherein processing a set of instructions, by a user interface automated navigation system running on a computer, each instruction indicating an action to perform on a user interface, further comprises:
    processing a script, by a user interface automated navigation system running on a computer, the script indicating a series of operations to perform on the user interface.

3. The method of claim 1 wherein determining whether the currently selected control is the control to activate in order to perform the action on the user interface indicated by the instruction further comprises:
    identifying a label associated with the currently selected control; and
    comparing the label associated with the currently selected control to at least one indication of the control to activate in order to perform the action on the user interface indicated by the instruction.

4. The method of claim 3 wherein comparing the label associated with the currently selected control to at least one indication of the control to activate in order to perform the action on the user interface indicated by the instruction further comprises:
    comparing an image of the label associated with the currently selected control to at least one image indicative of the control to activate in order to perform the action on the user interface indicated by the instruction.

5. The method of claim 3 wherein comparing the label associated with the currently selected control to at least one indication of the control to activate in order to perform the action on the user interface indicated by the instruction further comprises:
   using optical character recognition to translate an image of the label associated with the currently selected control into text; and
   comparing the text produced by the optical character recognition to at least one textual indicator of the control to activate in order to perform the action on the user interface indicated by the instruction.

6. The method of claim 1 wherein determining whether to activate the currently selected control responsive to whether the currently selected control is the control to activate in order to perform the action on the user interface indicated by the instruction further comprises:
   responsive to the currently selected control being the control to activate in order to perform the action on the user interface indicated by the instruction, 1) generating at least one input signal configured to activate the currently selected control, and 2) sending the at least one generated input signal to the user interface.

7. The method of claim 1 wherein determining whether to activate the currently selected control responsive to whether the currently selected control is the control to activate in order to perform the action on the user interface indicated by the instruction further comprises:
   selecting a new control on an active window of the user interface;
   determining whether the currently selected control is a control to activate in order to perform the action on the user interface indicated by the instruction; and
   responsive to whether the currently selected control is a control to activate in order to perform the action on the user interface indicated by the instruction, determining whether to activate the currently selected control.

8. The method of claim 1 wherein performing the action on the user interface indicated by the instruction for at least one instruction in the set further comprises:
   performing the action on the user interface indicated by the instruction, by the user interface automated navigation system running on the computer, for each instruction in the set.

9. At least one non-transitory computer readable storage medium storing a computer program product for automating user interface navigation, the computer program product comprising:
   program code for processing a set of instructions each instruction indicating an action to perform on a user interface; and
   program code for automatically performing, for at least one instruction in the set, the action on the user interface indicated by the instruction, by performing at least the following steps without prior information concerning a layout of the user interface, and without interacting with the user interface by using an automation Application Programming Interface supported by the user interface:
      identifying a currently selected control on an active window of the user interface, wherein the program code for identifying a currently selected control on an active window of the user interface further comprises:
         program code for capturing a first image of the active window of the user interface;
      program code for generating at least one input signal configured to change a control focus of the active window of the user interface;
      program code for sending the at least one generated input signal to the user interface;
      program code for capturing a second image of the active window of the user interface, after sending the at least one generated input signal to the user interface; and
      program code for comparing the first image of the active window of the user interface and the second image of the active window of the user interface;
      determining whether the currently selected control is a control to activate in order to perform the action on the user interface indicated by the instruction; and
      responsive to whether the currently selected control is a control to activate in order to perform the action on the user interface indicated by the instruction, determining whether to activate the currently selected control.

10. The computer program product of claim 9 wherein the program code for processing a set of instructions, each instruction indicating an action to perform on a user interface, further comprises:
   program code for processing a script, by a user interface automated navigation system running on a computer, the script indicating a series of operations to perform on the user interface.

11. The computer program product of claim 9 wherein the program code for determining whether the currently selected control is the control to activate in order to perform the action on the user interface indicated by the instruction further comprises:
   program code for identifying a label associated with the currently selected control; and
   program code for comparing the label associated with the currently selected control to at least one indication of the control to activate in order to perform the action on the user interface indicated by the instruction.

12. The computer program product of claim 11 wherein the program code for comparing the label associated with the currently selected control to at least one indication of the control to activate in order to perform the action on the user interface indicated by the instruction further comprises:
   program code for comparing an image of the label associated with the currently selected control to at least one image indicative of the control to activate in order to perform the action on the user interface indicated by the instruction.

13. The computer program product of claim 11 wherein the program code for comparing the label associated with the currently selected control to at least one indication of the control to activate in order to perform the action on the user interface indicated by the instruction further comprises:
   program code for using optical character recognition to translate an image of the label associated with the currently selected control into text; and
   program code for comparing the text produced by the optical character recognition to at least one textual indicator of the control to activate in order to perform the action on the user interface indicated by the instruction.

14. The computer program product of claim 9 wherein the program code for determining whether to activate the currently selected control responsive to whether the currently selected control is the control to activate in order to perform the action on the user interface indicated by the instruction further comprises:

program code for, responsive to the currently selected control being the control to activate in order to perform the action on the user interface indicated by the instruction, 1) generating at least one input signal configured to activate the currently selected control, and 2) sending the at least one generated input signal to the user interface.

15. The computer program product of claim 9 wherein the program code for determining whether to activate the currently selected control responsive to whether the currently selected control is the control to activate in order to perform the action on the user interface indicated by the instruction further comprises:

program code for selecting a new control on an active window of the user interface;

program code for determining whether the currently selected control is a control to activate in order to perform the action on the user interface indicated by the instruction; and program code for, responsive to whether the currently selected control is a control to activate in order to perform the action on the user interface indicated by the instruction, determining whether to activate the currently selected control.

16. The computer program product of claim 9 wherein the program code for performing the action on the user interface indicated by the instruction for at least one instruction in the set further comprises:

program code for performing the action on the user interface indicated by the instruction for each instruction in the set.

17. A computing device configured to automate user interface navigation, the computing device comprising:

a processor;

computer memory;

means for processing a set of instructions each instruction indicating an action to perform on a user interface; and means for automatically performing, for at least one instruction in the set, the action on the user interface indicated by the instruction, by performing at least the following steps without prior information concerning a layout of the user interface, and without interacting with the user interface by using an automation Application Programming Interface supported by the user interface:

identifying a currently selected control on an active window of the user interface, wherein the means for identifying a currently selected control on an active window of the user interface further comprises:

means for capturing a first image of the active window of the user interface;

means for generating at least one input signal configured to change a control focus of the active window of the user interface;

means for sending the at least one generated input signal to the user interface;

means for capturing a second image of the active window of the user interface, after sending the at least one generated input signal to the user interface; and means for comparing the first image of the active window of the user interface and the second image of the active window of the user interface;

determining whether the currently selected control is a control to activate in order to perform the action on the user interface indicated by the instruction; and responsive to whether the currently selected control is a control to activate in order to perform the action on the user interface indicated by the instruction, determining whether to activate the currently selected control.

\* \* \* \* \*